(12) United States Patent
Viroli et al.

(10) Patent No.: US 11,665,791 B2
(45) Date of Patent: May 30, 2023

(54) METHOD FOR DETERMINING PROPERTIES OF ELECTRICAL CURRENT PROVIDED TO AN INDUCTION HEATING ELEMENT

(71) Applicant: ELECTROLUX APPLIANCES AKTIEBOLAG, Stockholm (SE)

(72) Inventors: Alex Viroli, Forli (IT); Laurent Jeanneteau, Compiègne (FR); Massimo Nostro, Forli (IT); Massimo Zangoli, Forli (IT); Svend Erik Christiansen, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 17/764,271

(22) PCT Filed: Sep. 22, 2020

(86) PCT No.: PCT/EP2020/076352
§ 371 (c)(1),
(2) Date: Mar. 28, 2022

(87) PCT Pub. No.: WO2021/063731
PCT Pub. Date: Apr. 8, 2021

(65) Prior Publication Data
US 2022/0353959 A1    Nov. 3, 2022

(30) Foreign Application Priority Data

Sep. 30, 2019 (EP) ..................... 19200654

(51) Int. Cl.
*H05B 6/12* (2006.01)
*H05B 6/68* (2006.01)

(52) U.S. Cl.
CPC .......... *H05B 6/1236* (2013.01); *H05B 6/682* (2013.01); *H05B 6/686* (2013.01)

(58) Field of Classification Search
CPC ....... H05B 6/1236; H05B 6/682; H05B 5/686
(Continued)

(56) References Cited

U.S. PATENT DOCUMENTS 4,308,443 A * 12/1981 Tucker ................ H05B 6/065
                                            219/662
4,456,807 A *  6/1984 Ogino ................. H05B 6/062
                                            219/626
(Continued)

FOREIGN PATENT DOCUMENTS

| EP | 2827679 | 1/2015 |
| EP | 3405004 | 11/2018 |
| EP | 3448117 | 2/2019 |

OTHER PUBLICATIONS

International Search Report and Written Opinion for PCT/EP2020/076352, dated Dec. 15, 2020, 10 pages.

*Primary Examiner* — Quang T Van
(74) *Attorney, Agent, or Firm* — Pearne & Gordon LLP

(57) ABSTRACT

The invention relates to a method for determining properties of the electrical current provided to an induction heating element (2) of an induction cooking appliance (1). The induction cooking appliance (1) has a heating power energy unit (3) including a heating power generator (4) with at least one switching element (5) adapted to provide pulsed electric power to said induction heating element (2). The induction cooking appliance (1) also has an oscillating circuit (6) with at least one resonance capacitor (6.1, 6.2). The induction heating element (2) is electrically coupled with the heating power generator (4) and the oscillating circuit (6). The induction cooking appliance (1) also has a control entity (8), (Continued)

wherein an input of a measurement circuit (9) is coupled with a node of the heating power energy unit (3).

15 Claims, 4 Drawing Sheets

(58) Field of Classification Search
USPC ....... 219/660, 661, 662, 663, 664, 665, 666, 219/667, 668, 670, 671, 672, 674, 675, 219/620, 622, 625, 600; 363/132, 136, 363/137, 138, 34, 41, 95, 96
See application file for complete search history.

(56) References Cited

U.S. PATENT DOCUMENTS

| | | | | |
|---|---|---|---|---|
| 4,701,588 A | * | 10/1987 | Fukasawa | ........... H02M 7/5395 323/283 |
| 2015/0201467 A1 | | 7/2015 | Yun et al. | |

* cited by examiner

METHOD FOR DETERMINING PROPERTIES OF ELECTRICAL CURRENT PROVIDED TO AN INDUCTION HEATING ELEMENT

The present invention relates generally to the field of induction cooking appliances. More specifically, the present invention relates to a method for determining properties of electrical current provided to an induction heating element.

BACKGROUND OF THE INVENTION

Induction cooking appliances comprising induction heating elements, specifically induction coils are known in prior art.

In order to control the induction cooking appliance, properties of electrical current provided to the at least one induction heating element have to be known. In state of the art configurations, induction cooking appliances comprise multiple circuit portions which provide, as an output, information regarding phase delay, peak current etc. In addition, further circuit portions provide over-current protection, noise filtering and/or pot detection.

Disadvantageously, the complexity of a circuit providing at least some of upper-mentioned properties is high, leading to a large footprint of the circuit and high costs.

SUMMARY OF THE INVENTION

It is an objective of the embodiments of the invention to provide an induction cooking appliance which is configured to provide information for controlling the induction cooking appliance with reduced circuitry complexity. If not explicitly indicated otherwise, embodiments of the invention can be freely combined with each other.

It is known in the art that such household cooking hobs or cooking appliances usually are provided for conducting at least one cooking process comprising heating and/or cooling step, respectively. Such cooking process preferably at least comprises a heating step, e.g. frying, boiling, simmering or pouching of a foodstuff or a cooking liquid, respectively. For supporting the foodstuff or cookware item, it is particularly known to provide a cooking support, for example in the form of a cooking surface. Such cooking surface usually provides a support for the cookware items, for example, provided in the form of a plate element, particularly a glass or glass ceramic plate.

Preferably, the cooking hob comprises, preferably consists of, a cooking support and a lower casing. Thereby it is preferred that an open top side of the lower casing is covered by at least a part of the cooking support. The cooking support may be provided particularly as at least one panel, wherein preferably the panel is a glass ceramic panel. Preferably, at least one or more heating power transferring elements are arranged beneath the panel.

The lower casing may be manufactured from different material comprising plastics or metal, e.g. aluminum.

In particular, such casing may include a bottom wall and at least one sidewall. It is preferred that said casing is made of metal, e.g. aluminium or steel, and/or plastics, wherein preferably the casing made of metal is grounded.

Advantageously said lower casing may comprise at least one heating power energy unit, particularly arranged in a respective heating power energy unit housing, the heating power transferring elements, heating power transferring element carrier or heating power transferring element support. In other words, the lower casing and the cooking support may form a closed unit comprising all essential parts of the cooking hob. Thereby the lower casing may comprise fastening means for fastening and/or arranging the cooking hob on top of or in a cutout of a work plate.

Thereby, preferably, a power transferring element may be arranged below a cooking support. Preferably, the one or more heating power transferring elements are arranged in an upper portion of the lower casing of the cooking hob. A power transferring element may be arranged and supported by one or more heating power transferring element carrier or heating power transferring element support, preferably the power transferring element attached and/or arranged on said carrier or support. A housing comprising an energy power unit may be arranged below one or more heating power transferring element carrier or heating power transferring element supports. Thereby, preferably a heating power transferring element carrier or heating power transferring element support with the supported heating power-transferring element may advantageously be arranged on top of and/or attached to such housing of an energy power unit.

For conducting the cooking process, particularly a heating step, a cooking appliance, particularly the lower casing, comprises at least one heating power-transferring element. Said heating power-transferring element is provided for transferring heating power to the foodstuff or cooking liquid, preferably contained in a cookware item.

Preferably, the at least one heating power transferring element is an electric heating element, in particular an induction heating element, particularly induction coil, and/or radiant heating element. The heating power provided by a heating power-transferring element may be preferably provided electrically. Preferably, the heating power may be provided by a heat-generating magnetic field, more particularly an induction field. Accordingly, the cooking hob of the present invention preferably is an induction hob.

Preferably, a heating power-transferring element in the form of an induction coil comprises a planar conductive winding wire, particularly a copper wire. Preferably, an induction coil comprises at least one magnetic field supporting element, e.g. a ferrite element. Preferably, said at least one magnetic field supporting element, particularly at least one ferrite element, is arranged below the plane of the conductive winding wire. Said at least one magnetic field supporting element, particularly ferrite element, is advantageous in establishing and/or supporting the high frequent alternating magnetic field of the induction coil. Said magnetic field supporting element, particularly if arranged below the conductive winding wire, may be glued to or supported by ferrite support elements, e.g. snap fit connectors or the like.

Preferably, an induction coil comprises a shielding element, e.g. a mica sheet. The shielding element preferably is adapted to the form of the planar conductive winding wire or the form of at least two planar conductive winding wires of at least two adjacently arranged coils. The shielding element preferably is provided above the at least one magnetic field supporting element, particularly at least one ferrite element. The shielding element preferably in its main function is a support for the planar conductive wire windings of the coil. However, additionally the shielding element, particularly mica sheet, may also shield temperature radiated from the above, e.g. resulting from a heated up pot bottom.

In the cooking hob of the present invention the at least one heating power transferring element is preferably arranged and/or mounted on a heating power transferring element carrier or heating power transferring element support, particularly comprised in the lower casing. It is particularly preferred that a carrier made of aluminum sheet metal supports the heating power-transferring element. Particularly, the cooking hob of the present invention may comprise power transferring element carrier or heating power transferring element support to support one heating power transferring element, however, it is also considered herein that one power transferring element carrier or heating power transferring element support is provided to support more than one heating power transferring element.

In a preferred embodiment of the present invention, two heating power transferring elements are arranged on and supported by one common heating power transferring element carrier. Particularly at least two induction coils are arranged on and supported by one common induction coil carrier plate.

The heating power transferring element carrier or heating power transferring element support may be advantageously supported by or on a housing of the heating energy power unit.

Particularly, at least one of, preferably all of, the heating power transferring elements of an cooking hob of the invention, more particularly an induction coil of an induction hob, may be arranged below a cooking support, particularly a cooking surface in form of a plate element, and particularly within the lower casing, in order to provide the heat for a heating step to a heating zone of the cooking support and to the bottom side of a cookware item and foodstuff, respectively, when placed on said heating zone.

A cooking support of a cooking hob of the invention, particularly of an induction hob of the invention, preferably comprises at least one heating zone. Such heating zone as referred to herein, preferably refers to a portion of the cooking support, particularly cooking surface, which is associated with one heating power transferring element, e.g. a radiant heating element or an induction coil, which is arranged at, preferably below, the cooking support, e.g. the glass ceramic plate. Particularly, in an embodiment according to which the cooking hob of the present invention is an induction hob, it is preferred that such heating zone refers to a portion of the cooking support, which is associated with at least one induction coil. Thereby, the heating power transferring elements associated with a heating zone are preferably configured such that the same heating power of the associated heating power transferring elements is transferred to the heating zone. Preferably, the heating zone thus refers to a portion of the cooking support to which the same heating power of the associated at least one heating power transferring element is transferred.

In addition, the cooking hob of the present invention, may particularly be configured such that in one operation mode one or more than one heating zones form one cooking zone and/or are combined to one cooking zone, respectively. A cooking zone may be particularly provided as at least a portion of the cooking surface. Particularly, such cooking zone is associated with at least one heating zone. Additionally, or alternatively, a cooking zone may be associated with more than one heating zone. Particularly, a cooking zone may be associated with an even number, particularly two, four, six, eight or ten, more particularly two, heating zones. Alternatively, a cooking zone may be associated with an uneven number, particularly three, five, seven or nine, more particularly three, heating zones.

Preferably, the cooking hob of the present invention is configured such that a cooking zone comprises one or more than one heating zones, which can be driven with the same or different power, frequency or heating level.

In the present invention, it is preferred that in at least one operation mode of the cooking hob according to the present invention is configured such that a cooking zone comprises at least two, preferably two, heating zones, driven by the same power, frequency or heating level. Particularly, such cooking zone comprises or is associated with at least two, preferably two, heating power-transferring elements.

Additionally, or alternatively, the cooking hob of the present invention may be configured such that the number of heating zones associated with one cooking zone may vary and/or may be adjustable dependent on the needs of the cook and/or the size, form or kind of cookware placed on the cooking surface.

Particularly, a cooking hob according to the present invention, preferably an electric hob, such as an induction hob, may comprise at least one heating power energy unit. A heating power energy unit as used herein, preferably provides energy to at least one of, preferable a number of, the heating power transferring elements such that the heating power transferring element is capable of transferring heating power for heating up the foodstuff or cooking liquid. A heating power energy unit of an induction hob, for example, may provide energy in the form of a high frequency alternating current to a heating power-transferring element in the form of an induction coil, which transfers heating power in the form of a magnetic field to a suitable cookware item. For such purpose, a heating power energy unit may comprise at least one associated power circuit mounted and/or arranged on at least one printed circuit board. Preferably, a heating power energy unit is supported and arranged in a housing, preferably a plastic housing, preferably arrangeable in and adapted to the lower casing. This allows easy manufacturing and modularization.

Particularly, the housing may comprise supporting elements for supporting the heating power transferring element carrier or heating power transferring element support. Particularly, such supporting elements may comprise elastic means, e.g. springs or silicon elements, for elastically supporting the heating power transferring element carrier or heating power transferring element support, and particularly advantageous in pressing a heating power-transferring element onto the bottom surface of the cooking support plate, which particularly is a glass ceramic plate.

Particularly, the heating power energy unit, and particularly the associated power circuit, may be configured to be connected to at least one, preferably two phases of a mains supply. A cooking hob according to the present invention thereby comprises at least one, preferably two or three heating power energy units, connected to one or two, preferably one phases of the mains supply each.

Preferably, a heating power energy unit may comprise at least—one associated power circuit, particularly in the form of an at least one heating power generator, for generating heating power and supplying heating power-transferring elements with heating power, particularly for providing heating power to the at least one heating zone. Thereby the power circuit particularly may be provided in the form of a half-bridge configuration or a quasi-resonant configuration.

It will be immediately understood that the heating power energy unit may thus comprise one heating power generator for providing heating power to more than one heating zone, each associated with at least one heating power transferring element.

Furthermore, the heating power energy unit may comprise one heating power generator comprising a single or pair of high frequency switching elements.

In particular, the high frequency switching element is provided in the form of a semiconductor-switching element, particularly an IGBT element.

In case the heating power energy unit may comprise one heating power generator comprising a single high frequency switching element, the single switching element preferably forms part of associated power circuit, provided in the form of a or a part of a Quasi Resonant circuit.

In case that the heating power energy unit may comprise one heating generator comprises a pair of high frequency switching elements, said pair of high frequency switching elements preferably forms part of an associated power circuit, provided in the form of a or a part of a half-bridge circuit.

A person skilled in the art will immediately understand that the heat, generated by and/or radiated from particularly the heating power transferring elements, the heating power energy unit and/or the cookware item, particularly the bottom thereof, may have also disadvantageous effects, particularly regarding safety and proper functioning. Particularly, the heating power energy unit, more particularly power circuits comprising switching elements, may generate a significant amount of heat being disadvantage for the safety and proper functioning of the cooking hob. For this reason, the cooking hob comprises at least one cooling means. Particularly, said cooling means is adapted for cooling down the electric and/or electronic elements. Particularly, the heating power energy unit may comprise such cooling means. Such cooling means may comprise at least one of a fan, a cooling channel, a cooling body, preferably from a metal, particularly aluminium, cooling air-guiding means, cooling air deflection means and the like. Particularly, the cooking hob of the present invention may comprise such cooling means for cooling at least one heating power generator or a part thereof, particularly to at least one single or pair of high frequency switching elements. More particularly, such cooling means may comprise a cooling body, preferably arranged in the air path of a cooling fan, and thermally connected to at least one heating power generator or a part thereof, particularly to at least one single or pair of high frequency switching elements. Thereby it is preferred that the cooling means comprises at least one fan for generating an air stream through the cooling channel. Preferably, the cooling channel and/or cooling body extends horizontally through the cooking hob. For example, the cooling channel and/or cooling body extends over a substantial part of the horizontal width of the cooking hob.

The cooking hob according to the present invention preferably further comprises a control unit. Such control unit is preferably operatively connected with the heating power energy unit to control at least one operational parameter of the cooking hob, particularly an operational parameter of the heating power energy unit. Furthermore, the control unit comprises a user interface at least for receiving a command input of a user. This advantageously allows the user to control at least one operational parameter of the cooking hob, particularly an operational parameter of the heating power energy unit. Moreover, the control unit, and particularly a user interface if present, may be operatively connected to other appliances or interfaces, e.g. a suction hood, a voice control device, a server, a remote interface, a cloud-computing source or the like.

Accordingly, the household cooking hob according to the present invention comprises at least one electric and/or electronic element. Particularly, said at least one electric and/or electronic element comprises a heating power energy unit and/or control unit or parts thereof.

Particularly, the at least one electric and/or electronic element of the household cooking hob of the present invention may be part of an at least one heating energy power unit, preferably mounted and/or arranged on a power board and/or a power generating circuit mounted on a printed circuit board (PCB).

Such at least one electric and/or electronic element may be, for example, selected from the group comprising a heating power generator, filter coils, EMC filters, rectifier, switching elements, like IGBTs, relays, or the like.

According to an aspect, the invention refers to a method for determining properties of the electrical current provided to an induction heating element of an induction cooking appliance. The induction cooking appliance comprises a heating power energy unit including a heating power generator with at least one switching element adapted to provide pulsed electric power to said induction heating element. The induction cooking appliance further comprises an oscillating circuit comprising at least one resonance capacitor. Said induction heating element is electrically coupled with said heating power generator and said oscillating circuit. The induction cooking appliance further comprises a control entity. An input of a measurement circuit is coupled with a node of the heating power energy unit, said node providing an electrical value indicative for the electrical current applied to the induction heating element. The method comprises the steps of:

modifying the electrical value by the measurement circuit, said modifying at least comprising the provision of an offset value to said electrical value thereby obtaining a modified electrical value;

providing the modified electrical value to the control entity, said control entity performing the steps of:

Performing A/D conversion thereby obtaining digital samples of modified electrical value;

Calculating a first current characteristic by averaging signed digital samples of modified electrical value;

Calculating a second current characteristic by averaging absolute values of digital samples of modified electrical value; and Deriving information regarding the operational state of the induction cooking appliance based on said first and second current characteristic.

Said method is advantageous because operational state information of the induction cooking appliance can be derived with reduced effort. In addition, further information, e.g. pot detection information, phase delay information, peak current information or information required for emergency protection can be acquired with a simplified hardware circuit.

According to an embodiment, the node of the heating power energy unit is an output of a current transducer provided between the heating power generator and the induction heating element. Thus, the information provided by the current transducer is processed in order to derive additional information regarding operational state.

According to an embodiment, the node of the heating power energy unit is a node directly provided at the at least one resonance capacitor. In other words, the measurement circuit does not receive information from a current transducer but information of the oscillating circuit in which said resonance capacitor is included is used for deriving additional information regarding operational state.

According to an embodiment, a ratio value is calculated by dividing said first current characteristic by said second current characteristic. Said ratio value is indicative for the ratio of active power and reactive power applied to the induction heating element.

According to an embodiment, an estimated peak current is calculated by multiplying second current characteristic with a factor, said factor being dependent on said ratio value. Thereby it is possible to derive estimated peak current information in an arithmetic way.

According to an embodiment, said factor is derived by means of a function, specifically a linear function. Said function may be chosen such that a ratio value of 0.6 is associated with a factor of 1.8 and a ratio value of 0.9 is associated with a ratio value of 1.5. It is worth mentioning that the function also provides intermediate values between 0.6 and 0.9.

According to an embodiment, estimated phase delay is calculated based on a modified ratio value, said modified ratio value being derived by modifying said ratio value by means of a formula, specifically by means of a linear function. Said formula may be chosen such that a ratio value of 0.6 is associated with a factor of 0.88 and a ratio value of 0.95 is associated with a ratio value of 0.95. It is worth mentioning that the function also provides intermediate values between 0.6 and 0.95.

According to an embodiment, a compensation of missing sample fraction is performed if the time duration between two edges of a switching signal is not an integral multiple of sample time used for A/D-conversion. Thereby the error occurring due the discretization caused by timer cycle can be reduced.

According to a further aspect, the invention relates to an induction cooking appliance. The induction cooking appliance comprises a heating power energy unit including a heating power generator with at least one switching element adapted to provide pulsed electric power to an induction heating element and an oscillating circuit comprising at least one resonance capacitor. Said induction heating element is electrically coupled with said heating power generator and said oscillating circuit. An input of a measurement circuit is coupled with a node of the heating power energy unit, said node providing an electrical value indicative for the electrical current applied to the induction heating element. Said measurement circuit is configured to modify the electrical value, said modifying at least comprising the provision of an offset value to said electrical value thereby obtaining a modified electrical value. Said induction cooking appliance comprises a control entity, said control entity being configured to:

Receive said modified electrical value;
Perform A/D conversion thereby obtaining digital samples of modified electrical value;
Calculate a first current characteristic by averaging signed digital samples of modified electrical value;
Calculate a second current characteristic by averaging absolute values of digital samples of modified electrical value; and
Derive information regarding the operational state of the induction cooking appliance based on said first and second current characteristic.

Said induction cooking appliance is advantageous because operational state information of the induction cooking appliance can be derived with reduced effort. In addition, further information, e.g. pot detection information, phase delay information, peak current information or information required for emergency protection can be acquired with a simplified hardware circuit.

According to an embodiment of the induction cooking appliance, said the measurement circuit comprises a pair of resistors providing a voltage divider and a capacitor being arranged in parallel to one of the resistors of the voltage divider. Thereby an offset is provided to the output signal of the measurement circuit such that a micro controller which can only process positive voltage values, can directly process the output signal of the measurement circuit.

According to an embodiment of the induction cooking appliance, the measurement circuit comprises a protection circuitry for protecting the input port of said control entity. Thereby damages of the control entity, for example caused by overvoltage, can be avoided.

According to an embodiment of the induction cooking appliance, the input of the measurement circuit is coupled with an output of a current transducer or with a node directly provided at the at least one resonance capacitor. Said circuit nodes provide information which can be used for determining the operational state of the induction cooking appliance.

According to an embodiment of the induction cooking appliance, the measurement circuit comprises a low pass filter comprising at least one resistor and at least one capacitor in order to reduce the provision of noise to the control entity. Such low pass filter can be used for suppressing high frequency noise above a certain frequency threshold value in order to mitigate the influence of noise.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
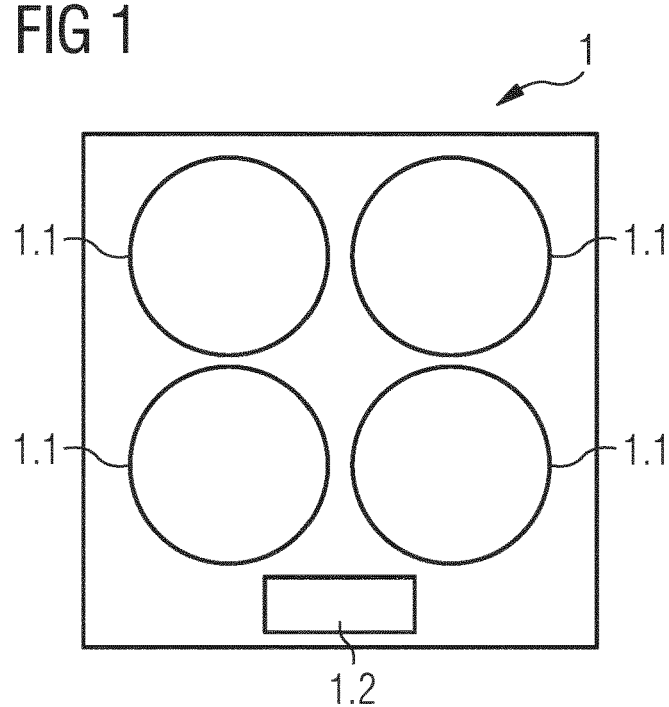
FIG. 1 shows an example top view on an induction cooking appliance comprising multiple heating zones.

The present invention will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features of the present invention disclosed in the specification, the claims, examples and/or the figures may both separately and in any combination thereof be material for realizing the invention in various forms thereof.

FIG. 1 illustrates a schematic diagram of an induction cooking appliance 1, in the present example an electric induction hob.

The induction cooking appliance 1 comprises multiple heating zones 1.1. Each heating zone 1.1 may be, for example, associated with one or more heating power transferring elements, specifically, one or more induction coils. The induction cooking appliance 1 may be configured to combine two or more heating zones 1.1 in order to form larger-sized cooking zones.

In addition, the induction cooking appliance 1 comprises a user interface 1.2, based on which a user may control the induction cooking appliance 1. For example, based on the user interface 1.2, the user may control the power level of the heating zones 1.1.

Figure 2:
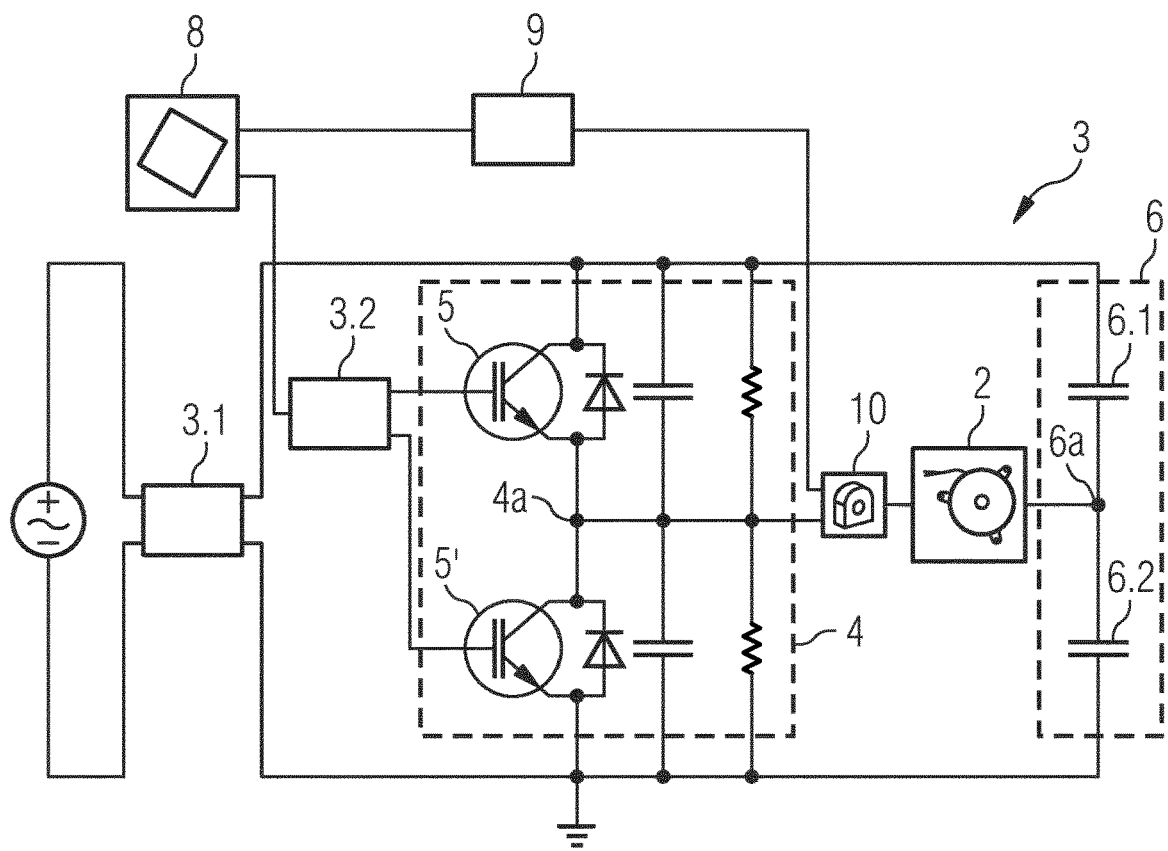
FIG. 2 shows a schematic diagram of a heating power energy unit with a measurement circuit and a control entity according to a first embodiment.

FIG. 2 shows a schematic diagram of a heating power energy unit 3 of an induction cooking appliance 1. The heating power energy unit 3 comprises an input stage 3.1. Said input stage 3.1 may be coupled with AC mains, e.g. 230V AC mains. Said input stage 3.1 may be adapted to rectify and/or filter the AC mains voltage. Specifically, the input stage 3.1 may comprise a rectification bridge. In addition, the heating power energy unit 3 may comprise a coil driver entity 3.2. The coil driver entity 3.2 may be adapted to control one or more switching elements 5, 5'. Said switching elements 5, 5' may be electrically coupled with said input stage 3.1 in order to receive rectified AC voltage. In addition, said coil driver entity 3.2 may be electrically coupled with control inputs of said switching elements 5, 5' in order to be able to provide pulsed electrical power to an induction heating element 2. Said switching elements 5, 5' may be, for example, IGBTs. The IGBTs may be integrated in a heating power generator 4, said heating power generator 4 being configured as a half-bridge converter.

Between said heating power generator 4 and said induction heating element 2, a current transducer 10 is provided. Said current transducer 10 may be adapted to provide information regarding the electric current provided through the induction heating element 2 (in the following referred to as coil current). The current transducer 10 may be electrically coupled with a circuit node 4a of the heating power generator 4 which is arranged between the pair of switching elements 5, 5' and—in addition—with the induction heating element 2.

At the opposite side of the current transducer 10, the induction heating element 2 is coupled with an oscillating circuit 6. Said oscillating circuit 6 may comprise a pair of resonance capacitors 6.1, 6.2, said resonance capacitors 6.1, 6.2 forming together with the inductivity of the induction heating element 2 an electrical resonant or quasi-resonant circuit which enables an oscillating excitation of the induction heating element 2. The induction heating element 2 may be coupled with a circuit node 6a being arranged between said pair of capacitors 6.1, 6.2.

Said current transducer 10 may be electrically coupled with a measurement circuit 9. Said measurement circuit 9 is configured to modify the electrical value provided by the current transducer 10. Said modifying step at least comprises the provision of an offset value to said electrical value. Thereby, the input values provided to the control entity 8 may comprise a positive voltage value which can be directly processed by a control entity 8 comprising a micro controller.

The output of the measurement circuit 9 is provided to a control entity 8. The control entity 8 processes information provided by the measurement circuit 9. More in detail, the control entity 8 may perform sampling of the provided signal and analog to digital conversion (A/D-conversion). The A/D-converted information may be further processed in order to derive information like peak coil current, phase delay or power factor in order to control the switching elements 5, 5' of the heating power generator 4 based on said information.

The sampling frequency is at least five times, preferably more than five times higher than the frequency of the switching signal provided to the switching elements 5, 5'. According to a preferred embodiment, the sampling frequency is at least 10 times higher than the switching frequency, specifically 20 times higher or even more. A sampling frequency being magnitudes higher than the switching frequency provides more accurate results.

Figure 3:
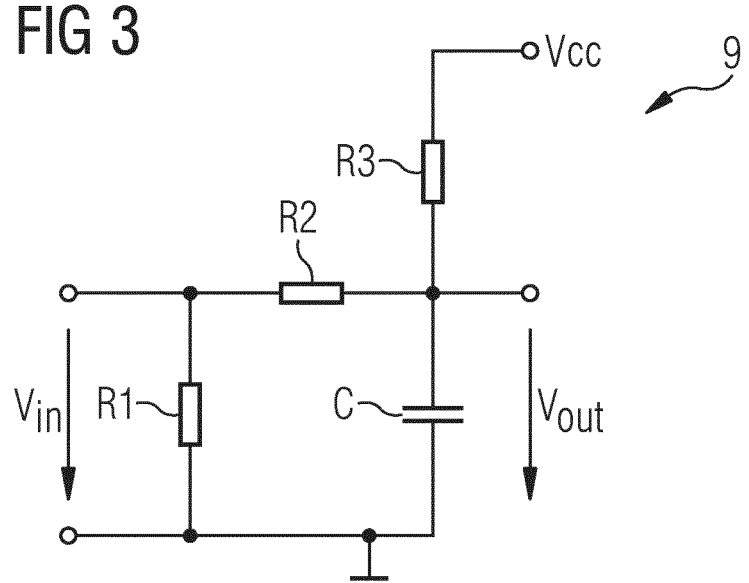
FIG. 3 shows an example first implementation of a measurement circuit to be used in a heating power energy unit according to FIG. 2.

FIG. 3 shows a first embodiment of a measurement circuit 9 to be used in a heating power energy unit 3 according to FIG. 2. The input signal may be a signal provided by the output port of the current transducer 10. More in detail, the input voltage $V_{in}$ applied to the measurement circuit 9 may be the voltage provided by the output port of the current transducer 10.

The measurement circuit 9 may comprise an input resistor R1 which is arranged in parallel to the input port. The input resistor R1 is providing a current to voltage translation/scaling, so input resistor R1 provides a voltage generator with the output impedance of R1. In addition, the measurement circuit 9 may comprise a second resistor R2 which is—on the one hand—directly electrically coupled with the input port and said input resistor R1 and—on the other hand—directly coupled via a common circuit node to a third resistor R3 and a capacitor C. The capacitor C is arranged between said common circuit node and mass, the third resistor R3 is arranged between supply voltage Vcc and said common circuit node. Capacitor C provides a filter function.

Preferably, the resistors R2 and R3 have the same or essentially the same resistance value. The resistance value of R1 may be magnitudes lower than the resistance values of resistors R2 and R3.

Based on resistors R2 and R3, said measurement circuit 9 may provide an offset to the input voltage such that the voltage of Vin which varies between [−Vin,max . . . Vin,max] is shifted to values of [0V . . . Vcc] of Vout.

The output voltage Vout provides a signal being indicative for the current provided to the induction heating element 2. The output voltage Vout also provides information regarding the sign of the current provided to the induction heating element 2. More in detail, a first signal range (e.g. Vout=[0V . . . Vcc/2[) may be indicative for a negative current value and a second signal range (e.g. Vout=]Vcc/2 . . . Vcc]) may be indicative for a positive current value.

Figure 4:
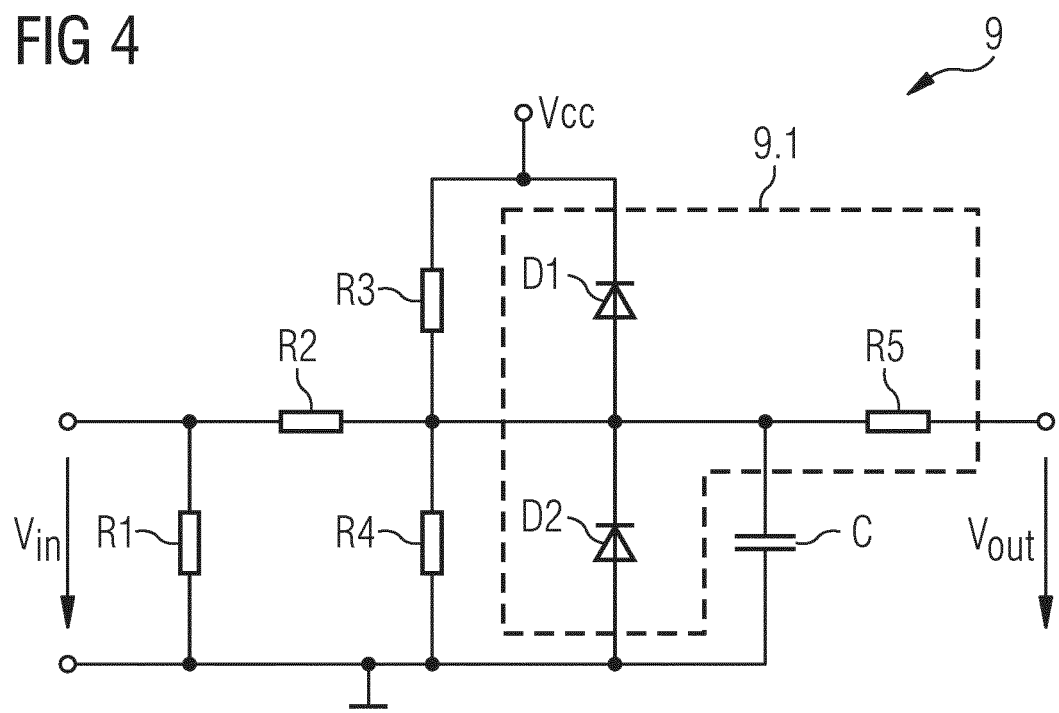
FIG. 4 shows an example second implementation of a measurement circuit to be used in a heating power energy unit according to FIG. 2.

FIG. 4 shows a second embodiment of a measurement circuit 9 to be used in a heating power energy unit according to FIG. 2. The main functionality of the measurement circuit 9 according to FIG. 4 is the same as described before in connection with FIG. 3. So, resistor R1 builds an input resistor and R2/R3 a voltage divider for providing an offset to the input signal Vin in order to shift the voltage of Vin from [−Vin,max . . . Vin,max] to values of [0V . . . Vcc] of Vout.

The measurement circuit 9 according to FIG. 4 further comprises a protection circuitry 9.1. The protection circuitry 9.1 is marked by the dashed line. The protection circuitry 9.1 is configured to provide protection to the input of the microcontroller which is coupled with the output port of the measurement circuit.

The protection circuitry 9.1 comprises a pair of diodes D1, D2 and a resistor R5. The diode D1 is arranged between Vcc and a common circuit node (which is also coupled with R2 and R3). The diode D2 is arranged between said common circuit node and mass. The resistor R5 is arranged between said common circuit node and the output of measurement circuit 9.

In addition, the measurement circuit 9 may comprise a resistor R4 which is arranged in parallel to diode D2, i.e. between said common circuit node and mass. Said resistor R4 is optional.

Figure 5:
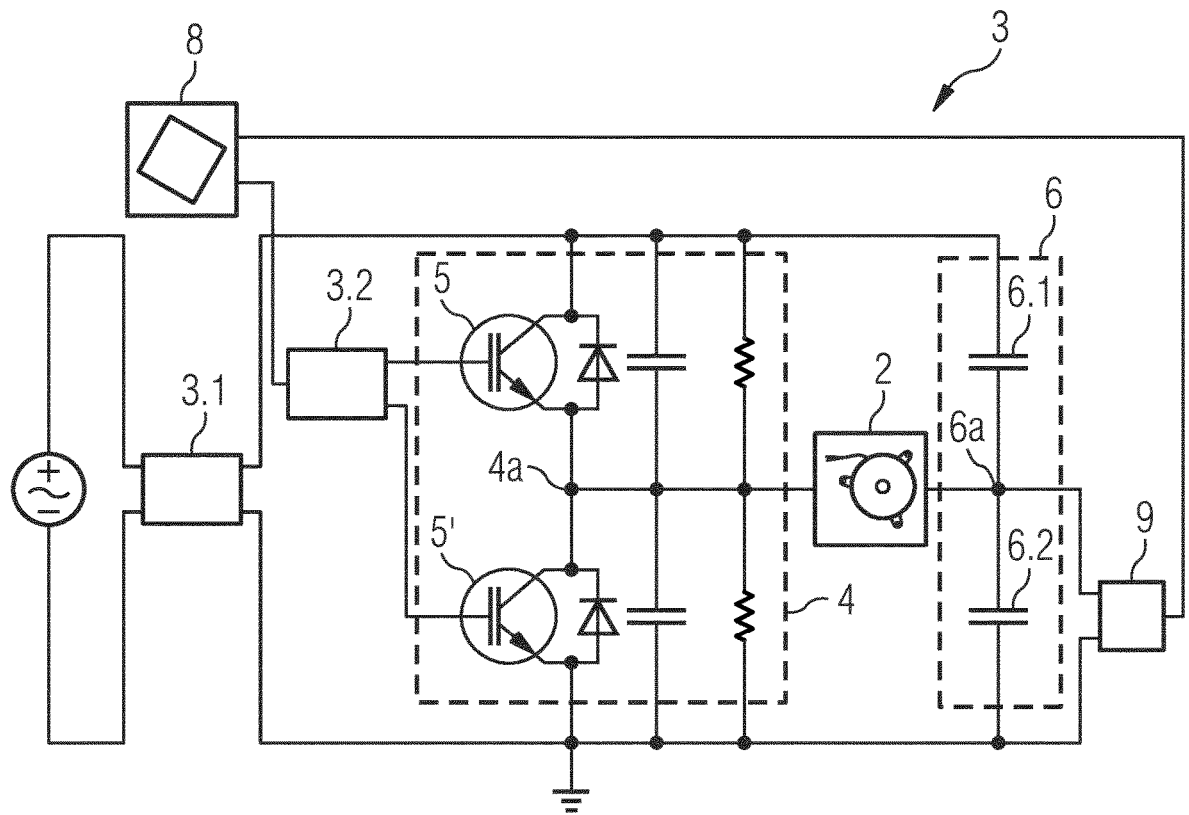
FIG. 5 shows a schematic diagram of a heating power energy unit with a measurement circuit and a control entity according to a second embodiment.

FIG. 5 shows a schematic diagram of a further embodiment of a heating power energy unit 3 of an induction cooking appliance 1. The main structure of heating power energy unit 3 according to FIG. 5 is the same as the embodiment of heating power energy unit 3 shown in FIG. 2. Thus, in the following, only the differences in view of the embodiment of FIG. 2 are described. Apart from that, the description of the embodiment of FIG. 2 also applies to the embodiment of FIG. 5.

The main difference of the heating power energy unit 3 according to FIG. 5 with respect to the embodiment of FIG. 2 is that the heating power energy unit 3 of FIG. 5 does not comprise a current transducer. So, the measurement circuit 9 does not receive a signal provided by the current transducer but the input of measurement circuit 9 is directly coupled with node 6a, i.e. the node arranged at or between the resonance capacitors 6.1, 6.2. The advantage of using a heating power energy unit 3 according to FIG. 5 is reduced costs because no current transducer is needed.

Figure 6:
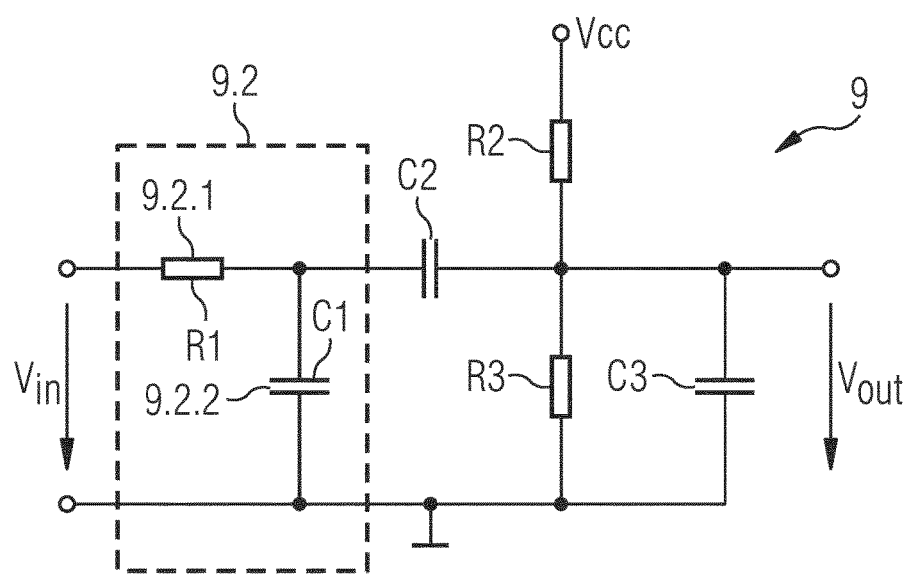
FIG. 6 shows an example implementation of a measurement circuit to be used in a heating power energy unit according to FIG. 5.

FIG. 6 shows an example embodiment of a measurement circuit 9 to be used in the heating power energy unit 3 according to FIG. 5.

At the input, the measurement circuit 9 receives the signal provided at circuit node 6a as an input signal. More in detail, said signal may be a voltage signal provided between the pair of resonance capacitors 6.1, 6.2. Said signal is indicative for the electrical current provided through the induction heating element 3, specifically the induction coil.

The measurement circuit 9 comprises a low-pass filter 9.2. Said low-pass filter 9.2 may be provided directly after the input port of the measurement circuit 9. In the present embodiment, said low-pass filter 9.2 is provided as a RC-filter by resistor R1 and capacitor C1. Also other implementations of low-pass filter are possible. The low-pass filter is configured to remove high frequency noise in order to avoid detrimental effects of said noise to the output signal of measurement circuit 9.

The measurement circuit 9 further comprises a capacitor C2 which couples the circuit node between R1 and C1 with a circuit node provided between a series connection of resistors R2 and R3. The capacitor C2 creates a differential signal of the voltage provided at node 6a between the pair of resonance capacitors 6.1, 6.2. The time derivative of the voltage provided at node 6a is directly proportional to the electrical current provided through the induction heating element 3 because said electrical current flows through resonance capacitor 6.2 and the current in said capacitor 6.2 can be expressed by $$I = C * \frac{dV}{dt};$$

The series connection of resistors R2 and R3 and the capacitor C3 arranged in parallel to the resistor R3 has similar technical effects as the corresponding electrical components of measurement circuits 9 according to FIGS. 3 and 4. More specifically, the resistors R2 and R3 provide a voltage divider for providing an offset to the input signal, as described before. Thereby the input signal which may have positive and negative values is shifted into a positive value range having voltage values between [0V . . . Vcc].

In the following, a method for processing the output signal provided by measurement circuit 9 is described. The output signal may be provided by any embodiment of measurement circuit 9 according to FIG. 3, 4 or 6. The processing may be implemented in software in a control entity 8. More specifically the software may be executed in a micro controller of a control entity 8.

Figure 7:
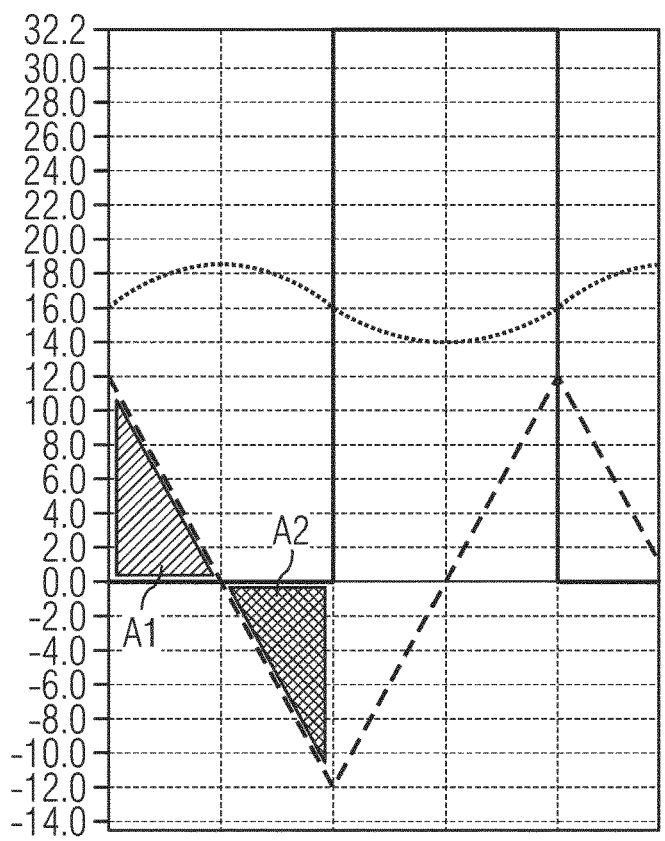
FIG. 7 illustrates curves of multiple electrical quantities of the heating power energy unit over time when no pot is provided above the induction heating element.

FIG. 7 shows a time diagram of signals provided in a heating power energy unit 3 which powers an induction heating element 2 at which no cooking utensil, specifically no pot is placed on. The square signal illustrated as solid line illustrates the middle point voltage at circuit node 4a, i.e. between the pair of switching elements 5, 5'. The square signal defines the timing, specifically the switching cycle of the switching elements 5, 5'. In the present embodiment, the duty cycle is 50%. However, in other embodiments, the duty cycle may be different to 50%.

The dotted line indicates the voltage provided at node 6a, i.e. between the resonance capacitors 6.1, 6.2. Finally, the dashed line indicates the electrical current provided through the induction heating element 2.

As shown in FIG. 7, the summation of coil current values in the first quarter of switching cycle (area A1) leads to a value which is equal to the absolute value of the summation of coil current values in a second quarter of switching cycle (indicated by area A2 and characterized by a negative slope and negative values). As such, the summation of values with sign over a half circle time of switching cycle leads to a value of zero in case that no cooking utensil, specifically no pot is provided over the induction heating element 2.

Figure 8:
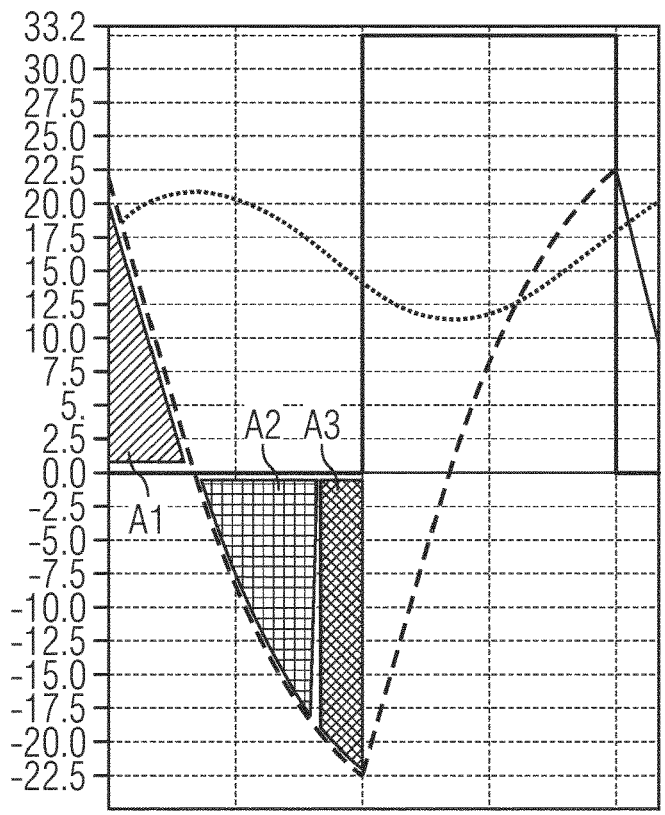
FIG. 8 illustrates curves of multiple electrical quantities of the heating power energy unit over time when a pot is provided above the induction heating element.

FIG. 8 shows a time diagram of the same signals as FIG. 7. However, the heating power energy unit 3 powers an induction heating element 2 at which a cooking utensil or pot is placed on. Said cooking utensil placed on the induction heating element 2 causes has a significant influence on the characteristics of the current flowing through the induction heating element 2. The dashed portion (portion A1) and the squared portion (portion A2) in FIG. 8 have the same area. Said portions are indicative for the reactive current flowing through the induction heating element (due to a phase shift of voltage and current). The remaining portion (area A3) within the half cycle time is indicative for the active current which provides active power to the induction heating element 2.

As such, information regarding the electrical current provided through the induction heating element 2 can be used for pot detection, phase delay measurement, overcurrent protection and/or peak-current-detection.

In the following, the method for determining properties of the electrical current provided to an induction heating element is disclosed in greater detail.

The control entity comprises an analog to digital converter (A/D converter). Said A/D-converter is configured to convert the signal provided at the output of the measurement circuit 9 directly. Said conversion may be performed, for example, at a conversion time of 1 μs or lower.

Said A/D conversion may be performed by sampling the analog signal and converting the sampled values into digital values. Said sampling may be performed in synchronization with the switching cycle of middle point voltage of half-bridge of the switching elements 5, 5'. More in detail, the first sample is established at the beginning of switching cycle.

A-D conversion may be performed according to a timer signal. One A/D-sample may have a duration of N timer counts.

Dependent on the operational state of the induction cooking appliance 1, A/D-sampling is only performed during a certain portion of the cycle time. For example, if the duty cycle is 50%, A/D-sampling may only be performed during one half the whole cycle time because of symmetry reasons.

Due to the discretization of AD sampling, the sample timing may not coincide with the switching cycle. In other words, the sample at the end of the cycle period or cycle period portion (in case that sampling is not performed through the whole cycle time) may be not exactly at an edge of the timer signal. So, there will be missing a fraction of a sample of between 1 and N timer counts which may lead to a certain error, specifically at high frequency. As disclosed further below, compensation may be calculated by interpolating the missing sample fraction at the end of the cycle.

In the following, calculations for deriving values for controlling the induction cooking appliance are described. The following calculations focus on a duty cycle of 50% of switching cycle. However, the induction cooking appliance may also be driven based on another duty cycle.

If the duty cycle is different to 50%, the evaluation can be done in two steps evaluating the two cycle parts. If as example the duty cycle is 30% the evaluation is split in a part 0-30% and a part 30-100%. Each part of the switching cycle is treated in the same way independently, but with opposite sign, and can be combined. For the purpose of calculating the active current it can be sufficient to process only one part, since the active current averaged over one cycle is the same in the two parts. However, to get information for circuit protection and pot coupling it may be needed to process both parts.

In addition, the measurement circuit 9 also receives information regarding the voltage (amplitude and phase) at node 6a of the oscillating circuit 6 and information regarding the voltage at circuit node 4a of heating power generator 4. Said information may be also available in digital domain due to A/D-conversion.

In the following, a method for determining active current provided to the induction heating element and the relation of active current to reactive current is disclosed.

TCNT_samples is an integer number representing the number of timer counts per single sample.

CYCLE_HCNT may be the number of timer counts in one half-cycle of generators switching cycle, wherein:

$$\text{CYCLE\_HCNT} = 0,5 * \frac{\text{Timer}_{frequency}}{\text{Generator}_{frequency}};$$

The number of samples n per one half-cycle of generators switching cycle may be calculated as:

$$n = \frac{\text{CYCLE\_HCNT}}{\text{TCNT\_samples}}.$$

An AD-offset value may be measured in steady off-state, i.e. when no current is provided to the induction coil. Said AD-offset value may be the voltage at the output of measurement circuit 9.

Based on said AD-offset value, signed AD samples can be calculated as follows:

Sample(i)=AD_sample(i)−AD_offset;

where i is an integer number reflecting the sample number in the respective half-cycle of generators switching cycle.

The active current may be calculated by summing up signed AD-samples (corrected by AD-offset value):

$$ActiveCurrent = \frac{1}{n} * \sum_{i=1}^{n} \text{Sample}(i);$$

The apparent current may be calculated by summing up absolute values of AD-samples (corrected by AD-offset value):

$$ApparentCurrent = \frac{1}{n} * \sum_{i=1}^{n} |\text{Sample}(i)|;$$

Based on ActiveCurrent and ApparentCurrent, a ratio value can be calculated:

$$\text{ratio} = \frac{ActiveCurrent}{ApparentCurrent};$$

Said ratio value gives an indication if a cooking utensil is provided at the induction heating element 2 and if the induction cooking appliance is operated close to resonance point. More in detail, a ratio value close to zero indicates a phase delay of around 90° between electrical current and electrical voltage provided to the induction heating element 2 and a ratio value close to 0.9 or higher may indicate that the induction cooking appliance is operated close to resonance point.

Based on upper-mentioned calculated values, an estimation of peak current and phase delay can be performed.

The estimated peak current can be calculated as follows:

EstimatedPeakCurrent=ApparentCurrent*PeakFactor;

PeakFactor=f(Ratio);

PeakFactor may be calculated by a formula, specifically a linear formula with Ratio as an input. For example, the formula may comprise the following structure:

$$PeakFactor(Ratio)=(a*Ratio)+b;$$

wherein a and b are rational numbers.

Preferably, the formula may be chosen such that a Ratio value of 0.6 is mapped to a PeakFactor of 1.8 and a ratio value of 0.9 is mapped to a PeakFactor of 1.5.

The estimated phase delay can be calculated as follows:

$$EstimatedPhaseDelayTimerCount=\frac{1}{2}*((1-CorrectedRatio)*CYCLE_{HCNT});$$

wherein $$CorrectedRatio=f(Ratio);$$

CorrectedRatio may be calculated by a formula, specifically a linear formula with Ratio as an input. For example, the formula may comprise the following structure:

$$CorrectedRatio(Ratio)=(c*Ratio)+d;$$

wherein c and d are rational numbers.

Preferably, the formula may be chosen such that a Ratio value of 0.6 is mapped to a CorrectedRatio of 0.88 and a ratio value of 0.95 is mapped to a CorrectedRatio of 0.95.

Outside the mentioned ranges of Ratio, the values of PeakFactor and CorrectedRatio may be mapped to a border value, similar to saturation effect.

As mentioned before, due to the discretization of AD sampling, the sample timing may not coincide with the switching cycle. In other words, the edge of the timer signal may not coincide with an edge of a switching signal defining the switching cycle.

In order to remedy the occurring error, the missing sample may be compensated. In the following, the compensation is described for the value of ActiveCurrent. However, the compensation scheme can also be applied to other values, e.g. ApparentCurrent etc.

The current values may be summed up in order to derive a sum value of current:

$$CurrentSum = \sum_{i=1}^{n} sample(i);$$

The fraction of missing sample can be calculated as follows:

$$SampleFraction = \frac{CYCLE\_HCNT \ \% \ TCNT\_SAMPLES(modulo)}{TCNT\_SAMPLES};$$

The missing sample can be approximated by using the last sample "sample (n)" as base.

$$CorrectedSum=CurrentSum+(Sample(n)*SampleFraction)$$

The average current can be calculated as follows:

$$CurrentAverage = \frac{CorrectedSum}{CorrectedN};$$

wherein $$CorrectedN=n+SampleFraction.$$

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS

1 induction cooking appliance
1.1 heating zone
1.2 user interface
2 induction heating element
3 heating power energy unit
3.1 input stage
3.2 coil driver entity
4 heating power generator
4a circuit node
5, 5' switching element
6 oszillating circuit
6a node
6.1 resonance capacitor
6.2 resonance capacitor
8 control entity
9 measurement circuit
9.1 protection circuit
9.2 low pass filter
9.2.1 resistor
9.2.2 capacitor
10 current transducer

The invention claimed is:

1. Method for determining properties of electrical current provided to an induction heating element of an induction cooking appliance, the induction cooking appliance comprising a heating power energy unit including a heating power generator with at least one switch adapted to provide pulsed electric power to said induction heating element, the induction cooking appliance further comprising an oscillating circuit comprising at least one resonance capacitor, said induction heating element being electrically coupled with said heating power generator and said oscillating circuit, the induction cooking appliance further comprising a control entity, wherein an input of a measurement circuit is coupled with a node of the heating power energy unit, said node providing an electrical value indicative for the electrical current applied to the induction heating element, the method comprising the steps of:
   modifying the electrical value by the measurement circuit, said modifying at least comprising provision of an offset value to said electrical value thereby obtaining a modified electrical value;
   providing the modified electrical value to the control entity, said control entity performing the steps of:
   performing A/D conversion thereby obtaining digital samples of modified electrical value;
   calculating a first current characteristic by averaging signed digital samples of modified electrical value;
   calculating a second current characteristic by averaging absolute values of digital samples of modified electrical value; and
   deriving information regarding an operational state of the induction cooking appliance based on said first and second current characteristics.

2. Method according to claim 1, wherein the node of the heating power energy unit is an output of a current transducer provided between the heating power generator and the induction heating element.

3. Method according to claim 1, wherein the node of the heating power energy unit is a node directly provided at the at least one resonance capacitor.

4. Method according to claim 1, wherein a ratio value is calculated by dividing said first current characteristic by said second current characteristic.

5. Method according to claim 4, wherein an estimated peak current is calculated by multiplying said second current characteristic with a factor, said factor being dependent on said ratio value.

6. Method according to claim 5, wherein said factor is derived by a linear function.

7. Method according to claim 6, wherein said function is chosen such that a ratio value of 0.6 is associated with a factor of 1.8 and a ratio value of 0.9 is associated with a ratio value of 1.5.

8. Method according to claim 4, wherein estimated phase delay is calculated based on a modified ratio value, said modified ratio value being derived by modifying said ratio value by a linear function.

9. Method according to claim 8, wherein said linear function is chosen such that a ratio value of 0.6 is associated with a factor of 0.88 and a ratio value of 0.95 is associated with a ratio value of 0.95.

10. Method according to claim 1, wherein a compensation of missing sample fraction is performed if a time duration between two edges of a switching signal is not an integral multiple of sample time used for A/D-conversion.

11. Induction cooking appliance comprising a heating power energy unit including a heating power generator with at least one switch adapted to provide pulsed electric power to an induction heating element and an oscillating circuit comprising at least one resonance capacitor, said induction heating element being electrically coupled with said heating power generator and said oscillating circuit, wherein an input of a measurement circuit is coupled with a node of the heating power energy unit, said node providing an electrical value indicative for electrical current applied to the induction heating element, wherein said measurement circuit is configured to modify the electrical value, said modifying at least comprising provision of an offset value to said electrical value thereby obtaining a modified electrical value, wherein said induction cooking appliance comprises a control entity, said control entity being configured to:

receive said modified electrical value;

perform A/D conversion thereby obtaining digital samples of modified electrical value;

calculate a first current characteristic by averaging signed digital samples of modified electrical value;

calculate a second current characteristic by averaging absolute values of digital samples of modified electrical value; and derive information regarding an operational state of the induction cooking appliance based on said first and second current characteristics.

12. Induction cooking appliance according to claim 11, wherein the measurement circuit comprises a pair of resistors providing a voltage divider and a capacitor being arranged in parallel to one of the resistors of the voltage divider.

13. Induction cooking appliance according to claim 11, wherein the measurement circuit comprises a protection circuitry for protecting an input port of said control entity.

14. Induction cooking appliance according to claim 11, wherein the input of the measurement circuit is coupled with an output of a current transducer or with said node, which is directly provided at the at least one resonance capacitor.

15. Induction cooking appliance according to claim 11, wherein the measurement circuit comprises a low pass filter comprising at least one resistor and at least one capacitor in order to reduce provision of noise to the control entity.

* * * * *